United States Patent [19]

Krempl et al.

[11] 4,216,403
[45] Aug. 5, 1980

[54] MONOAXIALLY ORIENTED PIEZOELECTRIC POLYMER TRANSDUCER FOR MEASUREMENT OF MECHANICAL VALUES ON BODIES

[75] Inventors: Peter Krempl, Vienna; Peter Claassen; Helmut List, both of Graz, all of Austria

[73] Assignee: Hans List, Graz, Austria

[21] Appl. No.: 927,844

[22] Filed: Jul. 25, 1978

[30] Foreign Application Priority Data

Jul. 27, 1977 [AT] Austria ................ 5505/77

[51] Int. Cl.² .............. H01L 41/18; H01L 41/10
[52] U.S. Cl. .................... 310/328; 310/334; 310/338; 310/800
[58] Field of Search .............. 310/800, 328, 334, 335, 310/337, 338

[56] References Cited

U.S. PATENT DOCUMENTS

| | | | |
|---|---|---|---|
| 2,578,505 | 12/1951 | Carlin | 310/334 X |
| 2,908,161 | 10/1959 | Bincer | 310/336 X |
| 3,239,696 | 3/1966 | Burkhalter et al. | 310/338 X |
| 3,255,401 | 6/1966 | Koln et al. | 310/328 X |
| 3,561,831 | 2/1971 | Alibert et al. | 310/338 |
| 3,587,561 | 6/1971 | Ziedonis | 310/335 X |
| 3,750,127 | 7/1973 | Ayers et al. | 310/800 X |
| 3,786,285 | 1/1974 | Reibold | 310/330 |
| 3,798,474 | 3/1974 | Cassand et al. | 310/800 X |
| 3,832,580 | 8/1974 | Yamamuro et al. | 310/800 X |
| 3,903,733 | 9/1975 | Murayama et al. | 310/800 X |
| 3,973,150 | 8/1976 | Tamura et al. | 310/800 X |

*Primary Examiner*—Mark O. Budd
*Attorney, Agent, or Firm*—Watson, Cole, Grindle & Watson

[57] ABSTRACT

A transducer comprising a piezoelectric measuring sensor element for measurement of mechanical values on hollow bodies, especially of the pressure distribution within pipes, the piezoelectric sensor element being a flexible piezoelectric film, the opposite surfaces of the film being in connection with electrically leading contact surfaces, and the measuring sensor element being at least partially and at least indirectly closely joinable to the surface of the hollow body.

9 Claims, 9 Drawing Figures

MONOAXIALLY ORIENTED PIEZOELECTRIC POLYMER TRANSDUCER FOR MEASUREMENT OF MECHANICAL VALUES ON BODIES

BACKGROUND OF THE INVENTION

This invention relates to a transducer comprising a piezoelectric measuring sensor element for measurement of mechanical values on hollow bodies, and especially for measurement of pressure distributions within pipes.

DESCRIPTION OF THE PRIOR ART

Transducers of the kind referred to are known, especially for the measurement of pressure distributions in injection pipes of injection internal combustion engines, mainly diesel engines, whereby from the charted pressure curve conclusions can be drawn with regard to the function of the injection pump and the injection valves.

For pressure measurements in diesel injection pipes, the basic idea is described as follows: pressure within the pipe is plotted as a function of time. Pressure rise in the pipe causes an enlargement of the pipe cross sectional area and therefore of the circumference of the pipe, this enlargement thus being measurable.

It is known to use piezoelectric transducers and to transmit the pressure pulsations of the injection pipe by means of a transmitter member to a piezoelectric disc of single crystal or ceramic. Arrangements of this kind, however, are very expensive and have the disadvantage of being characterized by a relatively large mass which is exposed to strong acceleration forces due to vibrations of the injection pipe in directions perpendicular to the pipe axis. Those forces can cause deformations of the pipe which are superposed with the deformations caused by the pressure pulsations, and all these forces are transmitted to the piezoelectric disc, thereby falsifying the pressure measurement. These problems occur in all those transducers measuring pressure distribution by way of deformation of the pipe and in which the transducer mass is not small enough to avoid measurable deformation of the pipe caused by vibrations the whole pipe. Besides of this, care has to be taken that vibration-caused deformations of the transducer mounting arrangement itself are not transmitted to the sensor element.

Another problem, especially in pipes which are subject to strong bending vibrations, is that the pipes are stretched at one part of the circumference and compressed on the opposite part. These stretches and compressions alternating with the vibration phases may be larger than the pressure-caused stretch of the pipe circumference. Locally sensing transducers which register the stretch of only a part of the circumference therefore disadvantageously also sense surface variations caused by vibrations and can give a quite incorrect measurement.

It is also known to attach strain gauges on pipes to measure stretch of the pipe or pressure within the pipe, respectively. Strain gauges have a number of advantageous properties, e.g., flexibility and little mass, and they are very well suitable for both static and dynamic measurements. However, an arrangement is necessary which guarantees a reproducible initial tension of the strain gauge. When the initial tension of the strain gauge is subject to greater variation caused by mounting, thermal expansion or the like, the necessary adjustment of the expensive measuring bridge needs additional activities. Such additional work never can be avoided when the relative dynamic stretches to be measured are in the order of $10^{-5}$ and lower. The mentioned difficulties happen with all strain gauges the physical properties of which are used to measure variations of length and which depend on the absolute value of the length.

Another essential disadvantage of strain gauges is the necessity to attach them to the pipe or body to be measured by means of a special adhesive. To ensure good adhesion and safe transmission of the pipe stretch to the strain gauge, it is necessary to make the measuring range on the pipe scrupulously clean. This necessitates additional time spent preparing the pipe for measurements.

For measurements on diesel injection pipes, for instance, the measuring results often are strongly falsified by the already mentioned vibrations. Compensation of this influence can be achieved—if at all—only by use of expensive, special strain gauges and only by use of skilled personnel. On grounds of the mentioned disadvantages, strain gauges are, despite their merits, practically not suitable, for instance, for quick workshop diagnosis of injection systems of diesel engines.

SUMMARY OF THE INVENTION

It is the aim of this invention to provide a transducer which enables the quick measurement of mechanical values of hollow bodies, e.g., pressure distribution within pipes, which are not provided with special arrangements for measurements, whereby great preparation work should be avoided. For measurements of pipes, opening of the same for application of a pressure transducer should hopefully not be necessary because not only is it often impossible to interrupt operation of a plant, but also opening of the pipe takes time, and the risk of soiling the inside of the pipe must be avoided.

According to the invention, in a transducer of the kind referred to, the piezoelectric measuring sensor element is a flexible piezoelectric film, the opposite surfaces of the film being in connection with electrically leading contact surfaces, and the measuring sensor element being at least partially, and at least indirectly, closely joinable to the surface of the hollow body.

The design of a transducer according to the invention enables the simultaneous use of the advantageous properties of strain gauges—flexibility, little mass and therefore high temporal resolution, stretchability and stretch sensitivity—and of the advantageous properties of piezoelectric sensors—direct measurement of relative variations from any given ground level (floating zero point), compression sensitivity, simple electronic processing of the charge signals—whereby the disadvantages of both transducer principles are avoided.

The piezoelectric film, which is advantageously chosen to be only a few $\mu$ thick, forms the dielectric of a capacitor, the electrically leading surfaces being used as the capacitor electrodes. The sensor element therefore can be used also for capacitive measurement of pressure distribution. This is an essential advantage because static or quasi-static and low frequent processes which cannot be measured piezoelectrically due to the limited insulation resistance, can be measured capacitively. The use of a flexible, piezoelectric film as a sensor element in a pressure transducer allows for the first time the application of one and the same transducer alternatively for piezoelectric or capacitive measurements of pressure distribution without the necessity of additional mounting expenditure.

The use of a flexible piezoelectric film as a measuring sensor element according to the invention gives the advantage that the sensor element may be joined closely also to curved surfaces of bodies, e.g., cylindersurfaces, so that good stretch, friction, and pressure contact between the surface of the body to be measured and the sensor element is attained, whereby precise measurement is enabled.

There are known a number of flexible dielectrics in the form of foils or films, the most of which may be considered as electrets in the sense that they possess a semi-permanent electric polarisation, the outer field of which is compensated by also semi-permanent surface charges. Such piezoelectrics show a longitudinal piezoelectric effect in the direction of the Z-axis (axes according to the IRE-convention) and transversal piezoelectric effects in the directions of the X- or Y-axis respectively. Some known piezoelectrics are for instance Polyvinylidene-Fluoride (PVDF), Polyvinyl-Fluoride (PVF), Polyvinyl-Chloride (PVC), Polyacrylo-nitrile (PAN), Polymethyl-Methacylate (PMMA), fluorinated Ethylene-Propylene (FEP), Polystrene, Polyethylene (PE) and its Terepthalate, Polycorbonate, Polysulfone, and Nylon.

The invention has the further advantage that by way of the elastic cross-contraction in Z-direction, an amplification of the piezoelectric and capacitive stretch sensitivity is obtained. Enlargement of a pipe further may be measured by means of a transducer according to the invention also over the longitudinal piezoeffect if the sensor element is so attached that the pipe stretch exerts pressure perpendicular to the surface of the sensor element. In many embodiments according to the invention the piezoelectric film will be subject to forces which cause stretching in the film parallel to the surface and pressure perpendicular to the surface of the film. This combination of stretch and pressure causes an especially high sensitivity in many embodiments.

According to a further feature of the invention, it may be advantageous to provide flexible interposition layers between the piezoelectric film and the surface of the body to be measured. These layers may serve as an electrical insulation, as protection against mechanical damage of the film, or for taking charge off the piezoelectric film.

It is further advantageous to provide a piezoelectric film consisting of a monoaxially-oriented polymer. Polymers of this kind have an especially high piezoelectric sensitivity; therefore, they are particularly suitable for transducers in the sense of the invention.

According to the invention the piezoelectric film may consist of Polyvinylidene-Fluoride, preferably of monoaxial-oriented $\beta$-Polyvinylidene-Fluoride. Among the mentioned piezoelectric Polymers, Polyvinylidene-Fluoride has an especially high piezoelectric sensitivity and a big dielectric constant. Ordinary PVDF is a mixed form of $\alpha$-und $\beta$-PVDF. The $\alpha/\beta$-mixed form of PVDF can be brought into the monoaxially-oriented $\beta$-form by stretching the PVDF-film inelastically, whereby the direction of the maximum sensitivity is identical with the direction of stretch. A PVDF-film pretreated in this manner has an especially high piezoelectric stretch sensitivity in X-direction which is about ten times higher than the sensitivity in Y-direction. This high piezoelectric sensitivity and the eminent chemical and physical stability makes this material particularly suitable for the use as a piezoelectric film.

It may be of particular advantage to build the electrically leading contact surfaces of thin electrically leading layers firmly connected to the surface of the piezoelectric film. These layers may be made, for instance, of metal deposited by evaporation or of an electrically-leading varnish.

According to the invention it is especially advantageous if the piezoelectric film is a strip of a monoaxially-oriented polymer under initial tension, the direction of the initial tension $X'$ and the direction X of the maximal piezoelectric stretch sensitivity of the film enclosing an angle minor 45 degrees. For that purpose the film is stretched around the hollow body, for instance a pipe, or pressed on it in such a manner that tangential initial tension occurs. Due to this orientation of the film, radial stretch of the pipe causes stretch of the piezoelectric film predominantly in the direction of its highest piezoelectric stretch sensitivity, this direction being in the film of monoaxially-oriented PVDF the direction of the X-axis. By this arrangement of a sensor element embracing the pipe, the radial and primarily only pressure-generated stretch of the pipe is registered in an intensified measure. Parasitic stretches and compressions of the pipe parallel to the axis of the pipe and therefore parallel to the Y-axis of the film, however, can cause only little interference due to the much less piezoelectric sensitivity in this direction.

By these means and the use of, for instance, monoaxial PVDF, weakening of vibration interference down to 1/10 of the interference which occurs when using piezoelectric films being isotropic in X- and Y-direction is attainable. This advantage is still preserved if the film is so arranged that its direction of orientation encloses an acute angle with the above-mentioned direction of maximal piezoelectric stretch sensitivity.

An especially advantageous embodiment of a transducer according to the invention is obtained when the sensor element built of the film and the electrically leading layers is attached on an electrically insulating tape. This embodiment is particularly suitable for stretch measurement at convex surfaces of any curvature, above all for stretch measurement of pipes of any diameter. The tape is adhered around the pipe, the eventually desired initial tension is gained during the attaching process. When stretch of an object with an electrically leading surface should be measured, the sensor element can be attached in a manner that the electrode adjacent to the measuring surface is connected to ground. Measurement is then carried out like with a unipolar piezoelectric transducer and the insulating tape forms a protective foil for the sensor element.

It may also be advantageous if at least the periphery portions of the insulating tape have a self-adhesive coating on the side pointing to the sensor element. This makes the mounting of the sensor element easier and cheaper.

According to a further feature of the invention the sensor element built of the film and electrically leading layers may be embedded between two connected flexible tapes or foils forming together with these foils a measuring strip. A quicker and simpler mounting of the measuring strip is possible and the sensor element is protected against undesirable ground contacts and soiling.

Transducers applied by means of adhesion have, quite advantageously, practically no vibration mass; however, use for instance for stretch measurements of strongly soiled and oily pipes makes cleaning of the measuring point necessary. For this type of application the measuring strip may be stretchable at least partially around the pipe and utilized as a tension binder. On grounds of easy mounting it is further particularly advantageous when the tension binder is performed in the form of a cable binder. The toothing provided at the clasp of a common cable binder and the matching catch from a self-locking clasp so that a transducer of this kind can be simply and tightly strained around the pipe.

In another embodiment the tension binder is provided with an easily releasable fastener, for instance a strainer. This embodiment has a relatively little mass, it is small, and it is easy to handle. It is especially advantageous when using it for measuring pressure distribution in pipes having nearly equal diameters.

According to another embodiment of the invention for measurements on pipes, attachment and initial tension of the measuring strip to the pipe is made by means of a spring. The advantage of quick mounting of the transducer is obvious, and because of the possibility of disengaging the transducer without destruction, it can be used again. It is especially advantageous to use an arrangement in which the spring embraces the pipe only with its both lateral rims over more than half of the circumference, the measuring strip connected to the spring thereby being stretched at least over a part of the circumference of the pipe. This embodiment is recommendable particularly for measuring pressure distribution on injection pipes of diesel engines, and it is very sturdy. The transducer is clamped on the injection pipe simply by snapping the spring on the pipe. Therefore, attachment of the transducer is carried out quite easily and quickly even in places of difficult access. Also, dismounting of the transducer is simple, so this embodiment is especially suitable for use in motor vehicle workshops. However, care has to be taken with respect to the choice of the right temper and size of the spring to keep parasitical spring vibrations below the tolerance limit for precise stretch measurement. This embodiment has the merits that the spring does not press against the measuring strip and simultaneously serves as a protective cover for the sensor element. The spring embraces the pipe at two (with respect to the measuring strip) axially staggered location and the piezoelectric sensor element is pressed on the pipe. An interposing layer may be provided for insulation of the sensor element against the pipe. Stretch of the pipe in a radial direction is transformed into stretch of or pressure on the piezoelectric film.

For measurements of pipes which are subject to heavy bending vibrations, it is particularly advantageous to choose the direction of minimal piezoelectric stretch sensitivity of the film substantially parallel to the axis of the pipe. In this case the signals generated by the bending vibrations are neglegibly small. According to a further arrangement such signals may be entirely compensated by attaching the piezoelectric film surrounding the pipe once or an integer multiple of once. The signals generated by the stretches and compressions at diametral opposite points of the circumference of the pipe caused by the bending vibrations are inverse and of the same amount so that a simple compensation is attained. The same effect is achieved if the transducer is provided with several sensor elements arranged symmetrically to the longitudinal axis of the pipe.

To perform measurements of metallic hollow bodies especially of pipes, it may be advantageous to stick the piezoelectric film directly on the surface of the hollow body by means of an electrically leading adhesive. In this case a particularly simple and stretch-transmitting connection between the sensor element and the hollow body is achieved. This type of attachment is particularly suitable for production line outfit of injection pipes of internal combustion engines.

Determination of temporal and local stretch condition of a pipe is possible if a number of measuring sensor elements according to the invention are attached to the pipe along its longitudinal axis. The stretch condition may be caused for instance by pressure within the pipe or by a body moving within the pipe and being at least partially in contact with the inner surface of said pipe. In particular determination of propagation of pressure or shock waves within a pipe is possible, thereby avoiding points of disturbance caused by sensor elements arranged at the inner surface of or pressure sensing openings in the pipe. With such an arrangement it is further possible to determine the movement of a body within a pipe, for instance the movement of a piston within a cylinder, or the movement of a projectile within a gun barrel.

According to a further embodiment of the invention one surface of the piezoelectric film embracing the pipe at least partially is connected to a number of electrically leading layers running parallel to each other. This integration of several transducers to a unit enables particularly dense and precise alignment of the single measuring points. Handling of such multiple-transducers is more time-saving and simpler than handling of a corresponding number of single transducers. The above-mentioned electrically leading layers may be applied, for instance, firmly at the surface of the film. In this connection use of the methods known for manufacturing printed circuits is especially advantageous.

DESCRIPTION OF THE DRAWINGS

The invention will be hereinafter more specifically explained with reference to some exemplary embodiments depicted in the accompanying drawings wherein.

DESCRIPTION OF THE PREFERRED EMBODIMENTS

Figure 1:
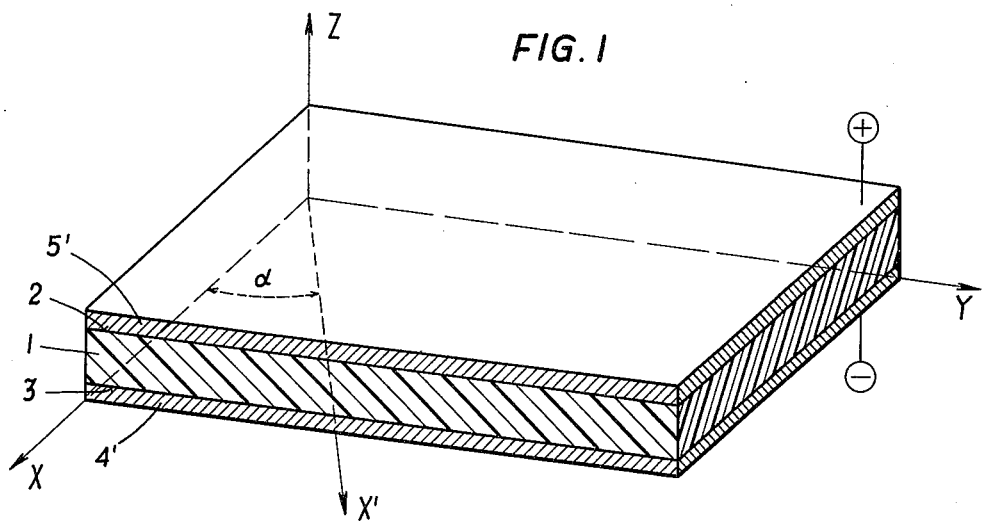
FIG. 1 schematically depicts a perspective cross-sectional view of a sensor element according to the invention.

FIG. 1 shows a piezoelectric film 1 forming a sensor element having contact surfaces 2 and 3, the crystallographical axes of the sensors element being signed with X, Y and Z. Monoaxially-oriented polymers direction X is chosen as the direction of the maximal stretch sensitivity parallel to the surface of the film. The direction of the initial tension is signed with X'. In most applications it will be advantageous to have angle α between the direction X of maximal sensitivity and direction X' of initial tension a value of zero or less than 45 degrees. Contact surfaces 2 and 3 of film 1 are each formed by an electrically leading layer 4', 5' consisting of metal evaporated on the film or of a conductive varnish. At least one of the contact surfaces 2, 3 may be provided with an insulated electrical connection leading to a charge collector or directly to an electrical measuring chain.

Figure 2:
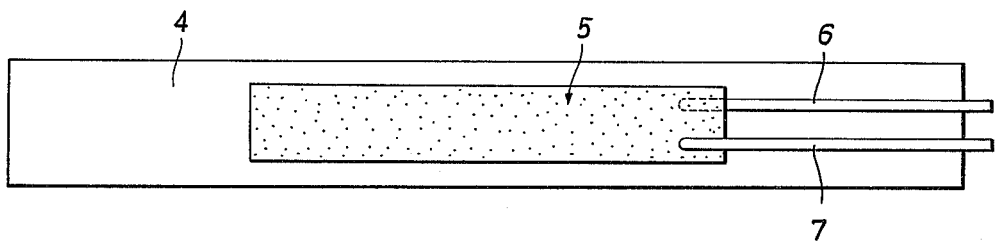
FIG. 2 shows the bottom view of a transducer according to the invention backed with a piece of insulating tape.
Figure 3:
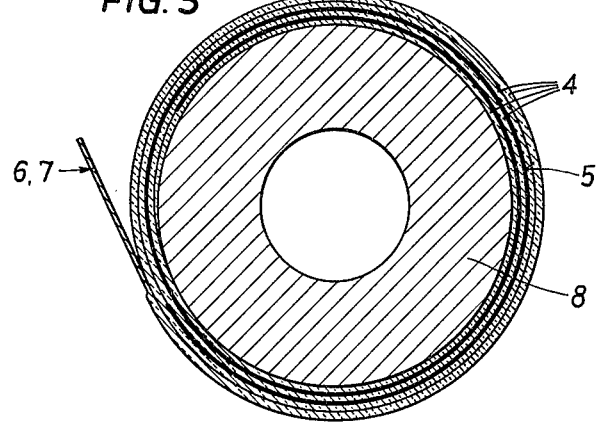
FIG. 3 depicts a cross-sectional view of a pipe to which the transducer of FIG. 2 is attached.

FIG. 2 shows a sensor element 5 consisting of a flexible piezoelectric film attached to an electrically insulating tape 4. For charge take off, leaders or printed leaders 6 and 7 are connected to the contact surfaces of the sensor element 5. FIG. 3 shows the sensor element of FIG. 2 attached to pipe 8, the free ends of the charge take off leaders 6, 7 being schematically indicated.

On the side facing the sensor element, tape 4 has a self-adhesive coating at least at the periphery portions projecting over sensor element 5. When sticking tape 4 on pipe 8, sensor element 5 is frictionally pressed against the pipe. Variations of the diameter of pipe 8 therefore are transmitted to sensor element 5 by friction between pipe 8 and the piezoelectric film. The sensor element itself is not adhered to the pipe.

Figure 4:
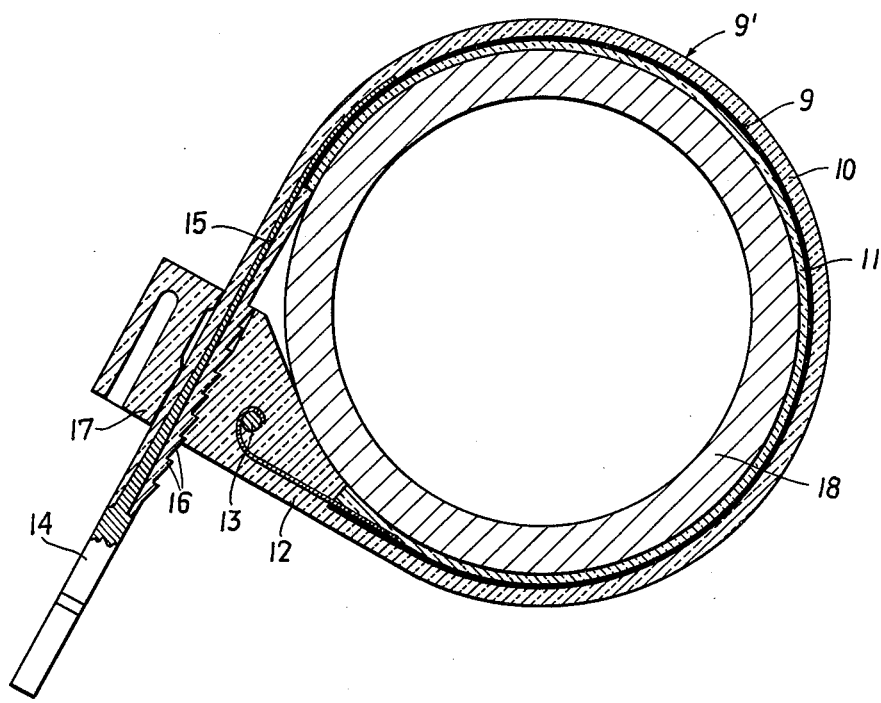
FIGS. 4 to 6 show depicts further embodiments of the invention representation according to that of FIG. 3.

FIG. 4 shows a transducer according to the invention with the piezoelectric sensor element 9 being embedded between two tapes or foils 10, 11 which are adhered or welded together. Tape 10 is preformed like a cable binder. Electrical connection of the electrodes of sensor element 9 to contact pins 13 and 14 is made by means of integrally casting in metal foil 12 and the foil-like end 15 of contact pin 14. Toothing 16 and catch 17 form a self-locking clasp so that this transducer can be simply and tightly around pipe 18. Tape 11 may consist of a material which improves friction transmission between the transducer and pipe 18.

Figure 5:
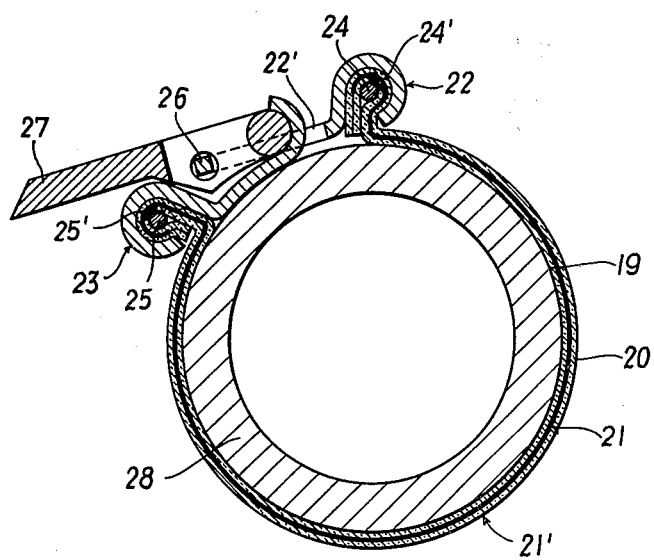

In the embodiment of FIG. 5 piezoelectric sensor element 21 again is embedded between two insulating tapes 19, 20 forming a flexible measuring strip, the ends of which are clamped by means of strainer parts 22, 23 and leader ends 24, 25. Small windows 24', 25' in the insulating tapes 19, 20 provide electrical contact between the electrodes of sensor element 21 and leader ends 24, 25. Strainer part 23 grips through aperture 22' in strainer part 22 and is urged in the direction of stretch of the measuring strip by means of straining lever 27 which is rotatable by axis 26. So the measuring strip surrounding pipe 28 is closed and provided with initial tension. This kind of a clasp is especially advantageous when the transducer is to be used for pressure measurements of pipes having nearly equal diameters.

Figure 6:
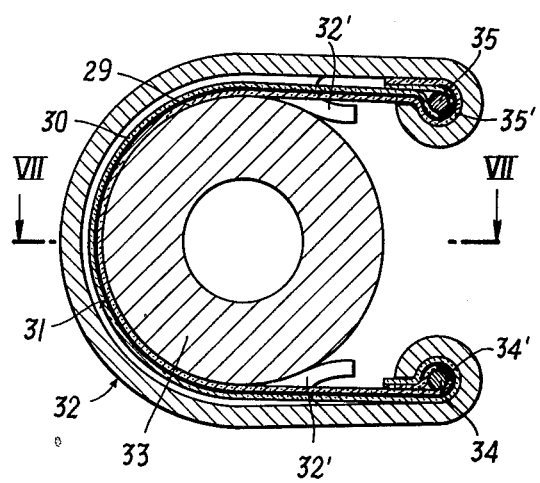
Figure 8:
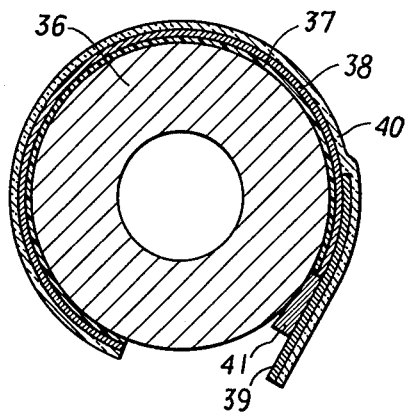
FIG. 8 represents a cross-sectional view of a pipe to which multiple-transducers have been attached, i.e., along line VIII—VIII of FIG. 9.
Figure 7:
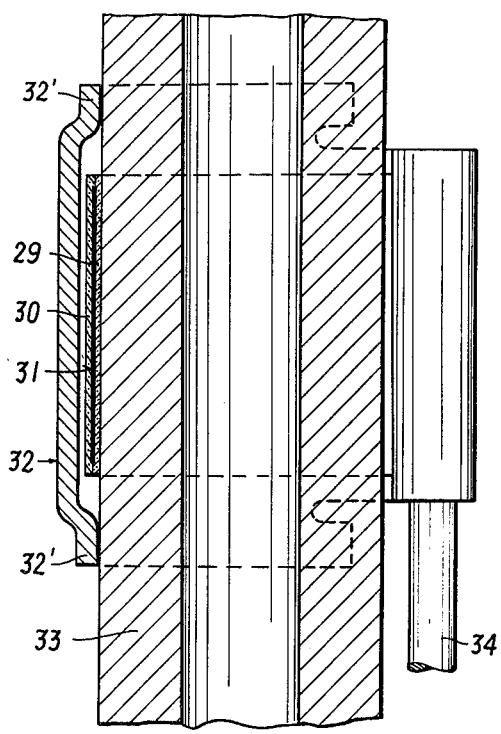
FIG. 7 represents a longitudinal sectional view along VII—VII of FIG. 6.
Figure 9:
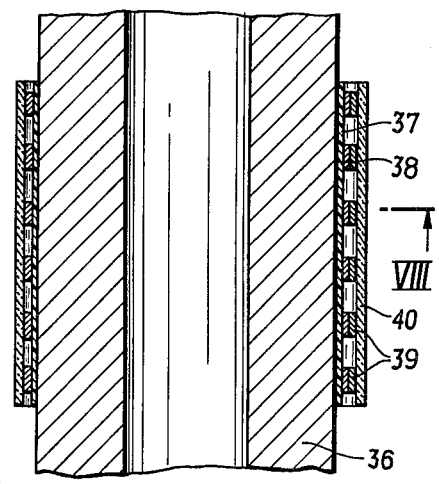
FIG. 9 represents a longitudinal sectional view of a pipe to which multiple transducers have been attached.

FIGS. 6 and 7 show a transducer which is particularly suitable for pressure measurements of injection pipes of diesel engines. Piezoelectric film 31 is embedded between electrically insulating tapes 29, 30, thereby again forming a measuring strip which is strained around injection pipe 33 by snap-on spring 32. Only both the outer seating surfaces 32' of spring 32 embrace injection pipe 33 by more than half of the circumference. The middle part of spring 32 does not touch pipe 33 or the measuring strip respectively and serves as a protective cover for the latter. The length of tapes 29, 30 and piezoelectric film 31 is chosen as to cause initial stretch and tension when snapping spring 32 on pipe 33. Electrical connection of the electrodes of film 31 to leader ends 34, 35 again is made by means of little windows 34', 35' in insulating tapes 29, 30. FIGS. 8 and 9 show several single-sensor-elements, which are combined together. Piezoelectric film 37 is applied to pipe 36 by means of an electrically leading adhesive. The outer surface of piezoelectric film 37 has a metal coating whereby some surface elements are uncoated along the circumference to achieve local separation to single elements. Sensor element 37 and leading layers 38 are protected against outer influences by insulating foil 40. The insulating foil 40 is provided at one of its end with electrically leading layers 39. Insulating foil 40 may be provided with leading layers 39 for instance by use of a copper coated foil at which the copper between leading layers 39 is etched away. Leading layers 38 and 39 may be also glued with film 37 or insulating foil 40, respectively, by means of an electrically leading adhesive. The measuring signals are lead to the periphery where they are taken off. Member 41 serves to fasten the electrical connecting part of insulating foil 40 at pipe 36 and is glued with pipe 36. Due to the electrically leading connection between piezoelectric film 37 and pipe 36, pipe 36 forms the common ground electrode for all layers 38 acting as charge take off electrodes.

We claim:

1. A transducer for measuring mechanical values of hollow bodies, especially the pressure distribution within pipes, said transducer including a piezoelectric sensor element in the form of a flexible monoaxially-oriented polyvinylidene-fluoride polymer film having opposite top and bottom surfaces; separate electrically leading contact surfaces in the form of thin metallic layers connected to each of said top and bottom surfaces of said flexible piezoelectric monoaxially-oriented polyvinylidene-fluoride polymer film; and means positioned to encompass one of said top and bottom contact surfaces so as to locate said flexible piezoelectric monoaxially-oriented polyvinylidene-fluoride polymer film adjacent the hollow body to be measured and to stretch said monoaxially-oriented polyvinylidene-fluoride polymer film such that it is under initial tension, the direction of initial tension X' and the direction X of the maximum piezoelectric stretch sensitivity of the film enclosing an angle of less than 45 degrees, the other of said contact surfaces being positioned between said flexible piezoelectric monoaxially-oriented polyvinylidene-fluoride polymer film and the hollow body from which measurements are to be taken.

2. A transducer device for measuring the pressure distribution within pipes which includes a piezoelectric sensor element in the form of a flexible film having opposite top and bottom surfaces; separate electrically leading contact surfaces in the form of thin metallic layers connected to each of said top and bottom surfaces of said flexible piezoelectric film; and an outer electrically-insulating foil positioned to encompass one of said top and bottom contact surfaces so as to wrap said flexible piezoelectric film around the pipe, said foil including means at the ends thereof for clamping together so as to stretch said foil around the circumference of the pipe.

3. The transducer device according to claim 2 wherein an inner electrically-insulating foil is attached to said other of said contact surfaces so as to be located between said other of said contact surfaces and said pipe from which measurements are to be taken.

4. The transducer device according to claim 3 wherein said end means of both said inner and outer electrically-insulating foils are connected, and are in the form of an interconnecting self-locking clamp.

5. The transducer device according to claim 3 wherein said end means of said inner and outer electrically-insulating foils together form bulbous portions, and said device includes a strainer clamp for pulling said bulbous portions towards one another when the remainder of said transducer device is wrapped around a pipe.

6. The transducer device according to claim 2 wherein said end means of said inner and outer electrically-insulating foils form bulbous portions, and wherein said device includes a spring clamp with gripping means at the ends thereof for encompassing said bulbous portions, said spring means acting to wrap the remainder of said transducer device at least partially around a pipe.

7. The transducer device according to claim 6 wherein said spring clamp is generally U-shaped and includes opposed outer seating surfaces connected thereto which are capable of gripping the pipe such that the middle part of the spring clamp does not touch the remainder of said transducer device.

8. The transducer device of claim 2 wherein said piezoelectric sensor element is of sufficient longitudinal dimension to wrap around a given pipe a multitude of times.

9. The transducer device of claim 3 wherein a multiplicity of piezoelectric sensor elements with electrically leading contact surfaces are positioned in side-by-side relationship between said inner and outer electrically-insulating foils.

* * * * *